(No Model.)

P. J. PARSONS.
SAFETY DEVICE FOR GRAIN MILLS.

No. 465,196. Patented Dec. 15, 1891.

WITNESSES:
P. H. Eagles.
L. Douville.

INVENTOR
Paul J. Parsons
BY
ATTORNEY.

UNITED STATES PATENT OFFICE.

PAUL J. PARSONS, OF PHILADELPHIA, PENNSYLVANIA.

SAFETY DEVICE FOR GRAIN-MILLS.

SPECIFICATION forming part of Letters Patent No. 465,196, dated December 15, 1891.

Application filed May 25, 1891. Serial No. 393,977. (No model.)

*To all whom it may concern:*

Be it known that I, PAUL J. PARSONS, a citizen of the United States, residing in the city and county of Philadelphia, State of Pennsylvania, have invented a new and useful Improvement in Safety Devices for Grain-Mills, which improvement is fully set forth in the following specification and accompanying drawings.

My invention consists of a safety device for a grain-mill, whereby explosions are prevented, as will be hereinafter described.

Figure 1:
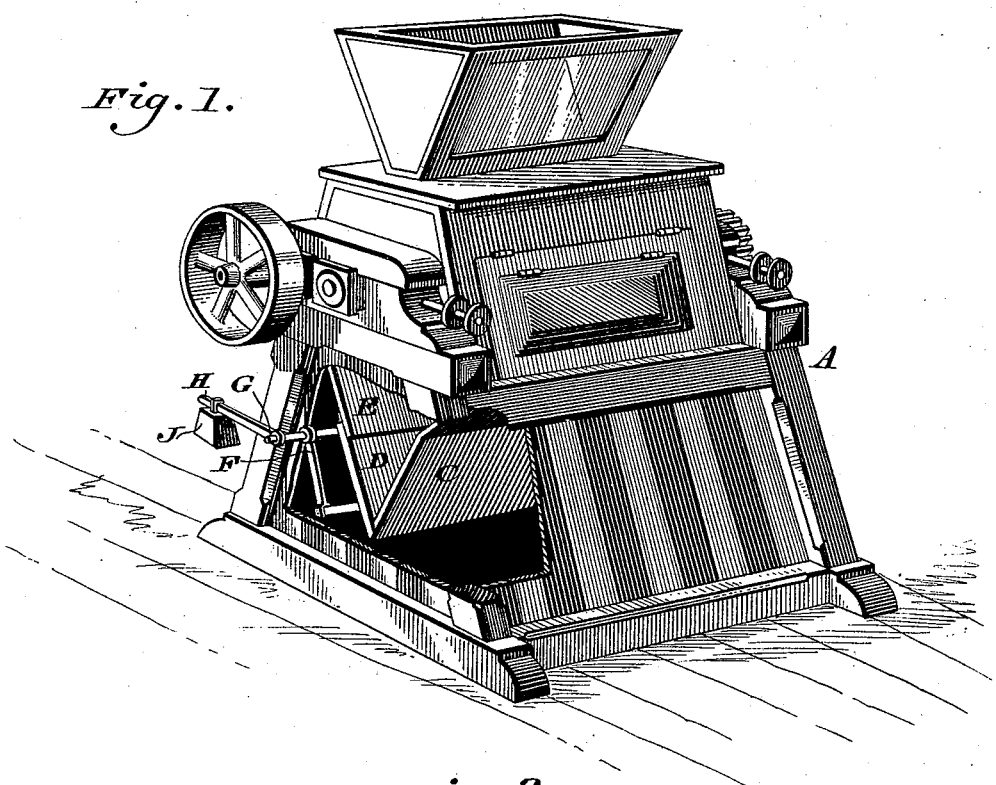
Figure 2:
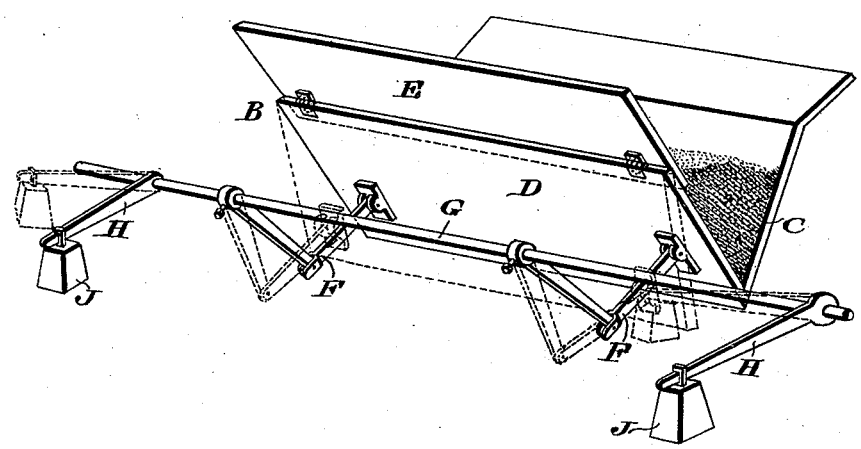

Figure 1 represents a perspective view of a mill partly broken away, showing the safety device embodying my invention. Fig. 2 represents a perspective view of said device detached.

Similar letters of reference indicate corresponding parts in the two figures.

Referring to the drawings, A designates a grain-mill, which, excepting the feature of my invention applied thereto, is of well-known construction. Within the casing, below the rollers, is a hopper B, which is properly supported therein and having converging side walls C D, the wall D being hinged to the upper connecting-piece E of the hopper and closing against the lower edge of the opposite wall as a trap and having secured to it the toggle-levers F, the outer ends whereof are attached to the rock-shaft G, whose bearings are on a proper part of the frame of the mill. To said shaft G are secured the arms H, which carry a weight J, whereby the trap D may be adjusted to open under predetermined pressure of the material in the hopper, it being seen that when the trap is in normal position it is closed, as shown in Fig. 2, thus preventing discharge of the material. It will also be seen that as the material falls from the rollers it enters the hopper, and when the weight of the same exceeds that of the adjustment of the trap the latter opens and permits the escape of the material, after which the trap quickly closes, and the hopper fills as before, so that draft of air below the rollers is cut off, and should fire be generated by the rollers by some foreign substance—such as flint, stone, heads of matches, iron, steel, &c.—the sparks are instantly smothered in the body of ground material in the hopper, whereby an explosion is prevented, it being evident that when the mill is stopped a quantity of ground material remains in the hopper, thus preventing liability of explosion from any cause below the rollers.

It will be noticed that the trap D is hinged to the part E above the toggle-levers F and independent of the rock-shaft G, it being also noticed that the toggle-levers F are secured to said trap near the lower part thereof, whereby the action of the weight J is exerted to hold the trap closed until the hopper is filled to a great extent. Then when the hopper is cleared said weight, acting upon the lower portion of the trap, quickly closes the hopper, so that refilling can immediately begin, the trap thus acting sensitively. Furthermore, the rock-shaft is not employed as the axis of the trap, and when it is relieved of the weight of the same it is not liable to be strained, which would be occasioned if it carried both the trap and the toggle-levers with connected parts. Furthermore, the toggle-levers are connected with the rock-shaft back of the trap, and thus simplify the construction of devices of the kind.

Having thus described my invention, what I claim as new, and desire to secure by Letters Patent, is—

A device for the purpose set forth, consisting of a hopper having a gate pivoted or hinged at its upper end and abutting against the lower edge of the opposite wall of the hopper, a weighted oscillating shaft independent of said hopper, and toggle-levers connected at one end to said shaft and at their other ends pivotally connected to the ends of the gate and normally supporting the same, said parts being combined substantially as described.

PAUL J. PARSONS.

Witnesses:
JOHN A. WIEDERSHEIM,
A. P. JENNINGS.